G. H. THORP.
HOT AIR DRYING PLANT.
APPLICATION FILED JAN. 28, 1910.
981,719.
Patented Jan. 17, 1911.
2 SHEETS—SHEET 1.
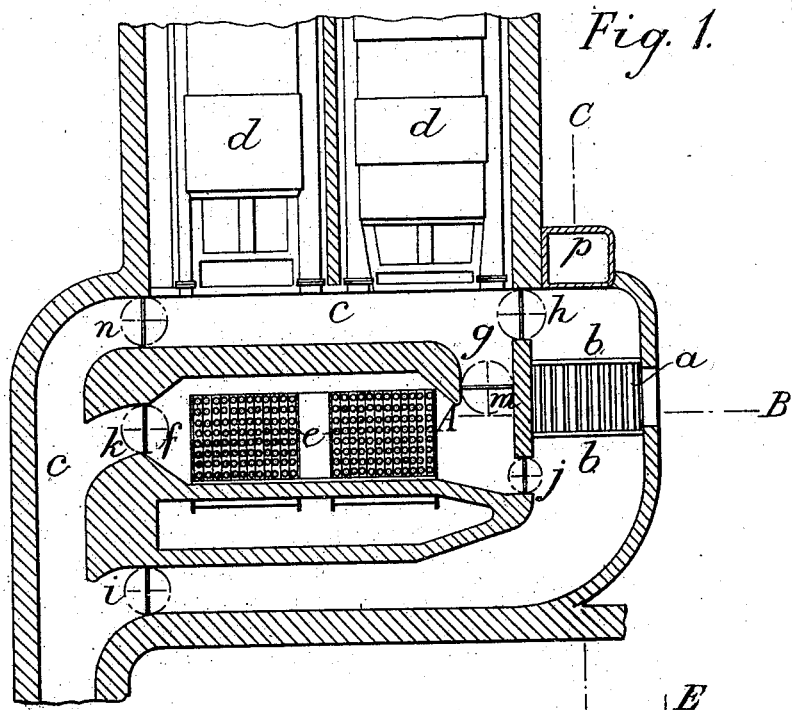
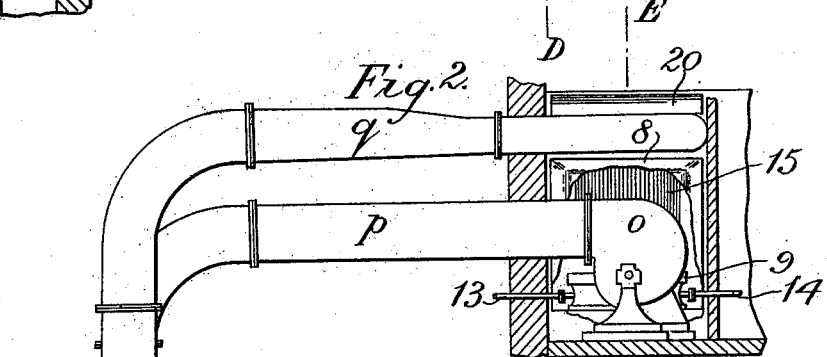
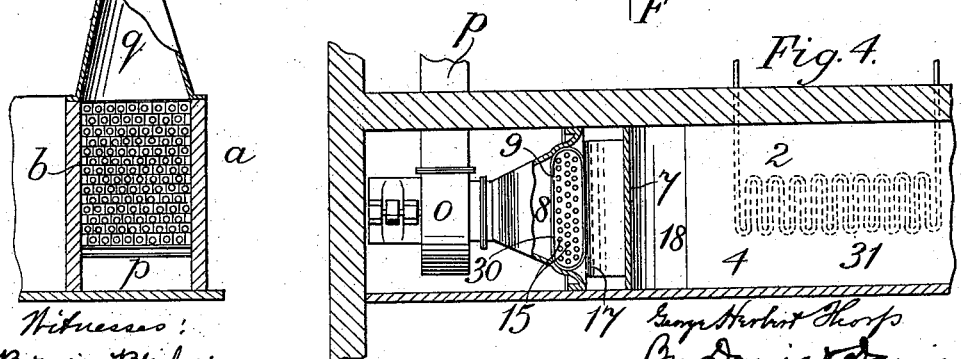

G. H. THORP.
HOT AIR DRYING PLANT.
APPLICATION FILED JAN. 28, 1910.
981,719.
Patented Jan. 17, 1911.
2 SHEETS—SHEET 2.
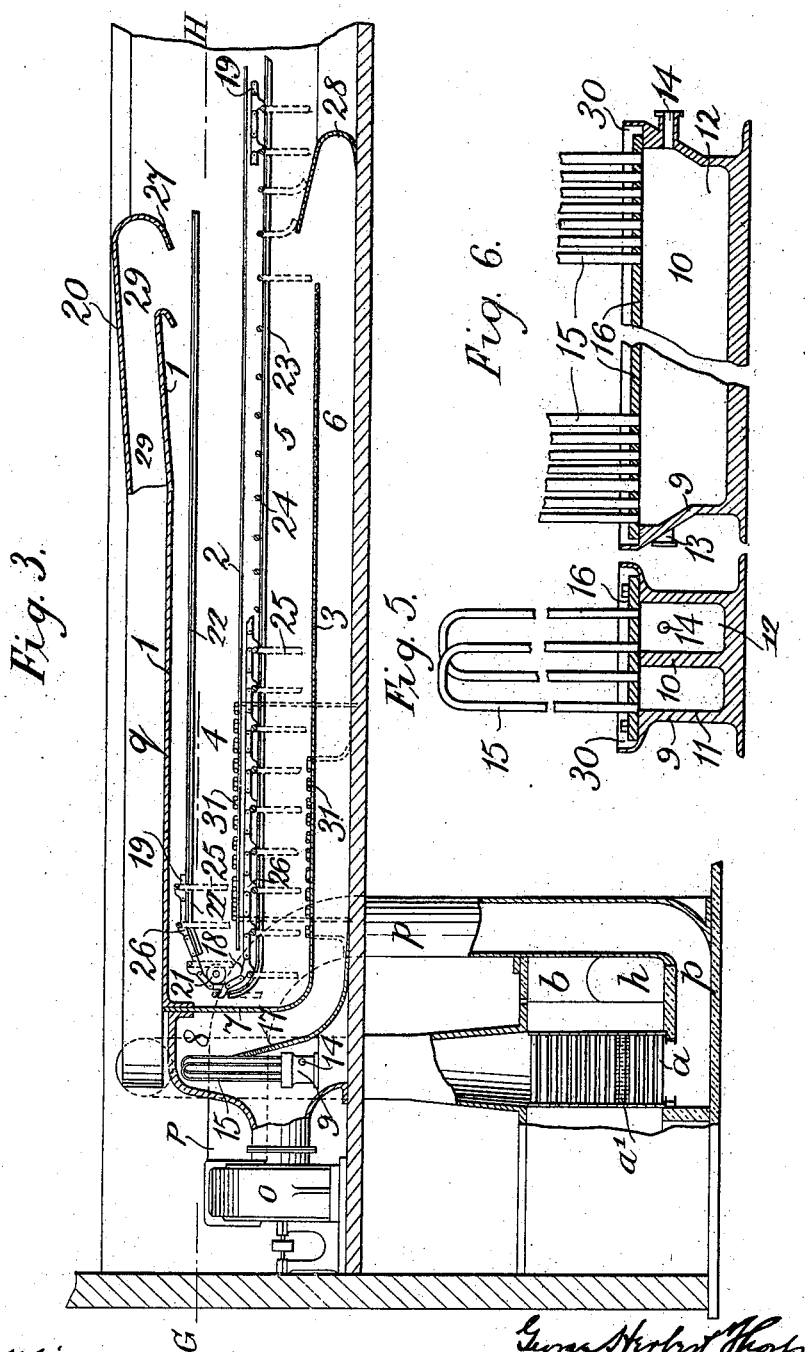

UNITED STATES PATENT OFFICE.

GEORGE HERBERT THORP, OF YARASLOFF, RUSSIA.

HOT-AIR DRYING PLANT.

981,719. Specification of Letters Patent. Patented Jan. 17, 1911.

Application filed January 28, 1910. Serial No. 540,493.

*To all whom it may concern:*

Be it known that I, GEORGE H. THORP, a subject of the King of Great Britain, residing at Yarasloff, Russia, have invented Improvements in and Relating to Hot-Air Drying Plants, of which the following is a specification.

This invention relates to hot air drying plants and has for object to provide a drying machine and plant especially suitable for drying flax, wool, and calico although also suitable for drying other substances such for example as corn or the like, and in which the necessary hot air is obtained with less consumption of fuel than heretofore for a hot air drying plant of corresponding capacity, the liability of burning the substances being dried is minimized, and from which the dried substances are delivered at a suitable temperature as required by the substances being dried and to avoid waste of heat being carried out of the machine by the dried substances.

Conveniently and economically the improved heating plant can be combined with boilers that supply steam for motive power purposes and with a heat economizer arranged in a flue of such boilers and adapted to heat the feed water by the waste heat from the boiler furnaces.

Figure 1 of the accompanying illustrative drawings shows in sectional plan one arrangement of hot air drying plant according to this invention. Fig. 2 is a vertical section partly corresponding to the line A, B of Fig. 1. Fig. 3 is a vertical section in a plane at right angles to that of Fig. 2, partly corresponding to the line C, D of Fig. 1 and partly corresponding to the line E, F of Fig. 2. Fig. 4 is a plan, partly in horizontal section corresponding to the line G, H of Fig. 3. Fig. 5 is a vertical transverse section and Fig. 6 is a longitudinal vertical section showing a cooler and water extractor.

In the arrangement of combined plant shown in Figs. 1 to 4 the hot air generator comprises a series of tubes $a$ arranged in a branch or by-pass $b$ of the main flue $c$ of the boilers $d$. The economizer $e$ is arranged in a branch flue $f$ connecting the hot air generator branch or by-pass $b$ with the main flue $c$, and a passage $g$ connects the main flue $c$ to the inlet end of the economizer branch flue $f$; dampers are fitted controlling the hot air generator branch flue inlet $h$, the outlet $i$ of said branch flue, the inlet $j$ therefrom to the economizer flue $f$, the outlet $k$ from the economizer flue $f$ and the inlet $m$ to the economizer flue $f$ from the main flue $c$ and also at $n$ in the main flue at a point between the boilers $d$ and the outlets $k$ and $i$, the arrangement being such that by opening the dampers at $h$ and $i$ and closing all the others the hot gases can be caused to pass through the hot air generator $a$ alone on their way from the boilers $d$ to the chimney; through the hot air generator $a$ and the economizer $e$ in series by opening the dampers at $h$, $j$ and $k$ and closing the other three; through the economizer alone (as while cleaning the hot air generator tubes) by opening the dampers at $m$ and $k$ and closing the others; and, by opening the damper at $n$ and closing the others, direct to the chimney without passing through either the hot air generator $a$ or the economizer $e$.

The tubes of the hot air generator $a$ extend in the direction of the flow of hot gases and are formed at each end with flanges as shown that fit one against the other in such way as to completely block the spaces between the several tubes and between the tubes and the flue walls and thereby compel the gases to pass through the tubes. The number and bore of the tubes are such as to at least correspond to the area of the branch or by-pass $b$ so as not to unduly retard the gases passing therethrough. The tubes may be formed with radiating fins or gills as indicated by dotted lines at $a^1$ in Fig. 3.

By means of a fan $o$ (Figs. 2, 3 and 4) arranged conveniently near the drying machine proper, which in the plant illustrated is located on a floor above the ground floor, air that has done duty in the drying machine is caused to flow, through a suitable conduit $p$, beneath the flue floor or any other approved way to the hot air generator $a$ among and between the tubes thereof where it is reheated and away by another conduit $q$ to the entrance end of the drying machine.

The drying machine under notice is designed for drying flax or the like in hank form and comprises a somewhat long chamber of oblong cross section, open at its front end and having extending along its length three partitions 1, 2 and 3 that divide the chamber into four longitudinal compartments or channels 29, 4, 5 and 6 located one above another.

.The rear part of the partition 3 is bent upwardly at 7 and connected to the upper partition 1 and in the chamber 8 so formed between the rear end of the machine, where it is connected to the inlet of the fan o and the upturned rear end 7 of the partition 3 there is arranged a cooler and water extractor, Figs. 5 and 6, comprising a hollow box 9 or base divided longitudinally by a central vertical partition 10 into an inlet chamber 11 and an outlet chamber 12 fitted respectively with inlet and outlet water pipes 13 and 14, and a number of inverted U shaped pipes 15 that are connected at their ends to a plate 16 that forms the cover of the box or base 9. The pipes 15 extend vertically in the path of the air drawn from the drying machine and each pipe connects the inlet chamber 11 to the outlet chamber 12 of the box or base 9. A suitably arranged upwardly extending baffle or guide plate 17, which may be perforated, directs the air onto the cooling pipes 15.

Between the rear end of the middle or intermediate partition 2 and the upturned rear part 7 of the partition 3 a space 18 is left for the passage of a pair of endless chains 19 which, in the example under notice run over a drum, not shown but located near the front end of the machine, and a guide roller 21 within the machine near its rear end. The upper lengths of the chains 19 are supported on longitudinal angle irons or the like guides 22 fixed to the side walls of the chamber 4. Below the middle or intermediate partition 2 the side walls are formed with grooves or fitted with other angle iron or the like supports 23 for the ends of poles 24 adapted to have freely hung thereon hanks 25 of flax or the like. Snugs 26 on the chains 19 are adapted to come into contact with the poles 24 and move them, with the hanks 25, along their supports 23 from the front end of the machine toward the rear thereof and then to raise them above the middle or intermediate partition 2 and carry them supported on the chains 19 back toward the front end of the machine.

The front end of the upper wall 20 of the machine is curved downwardly at 27 to deflect the hot air into the chamber 4 and at the bottom of the machine near its front end a curved baffle or guide plate 28 is provided for deflecting the hot air to the chamber 6 formed between the lowest partition 3 and the bottom of the machine.

Cooling water is pumped through the cooler and water extractor hereinbefore described and the arrangement is such that hot air passes through the conduit $q$ to the rear end of the passage 29 formed between the wall 20 and the partition 1, passing thence into the front end of the chamber 4 between the partitions 1 and 2 continuing to flow to and fro through the remaining chambers 5 and 6 and past the cooler and water extractor (9 to 16) to the fan o and back to the heater a through the conduit $p$.

The hot air flows in the reverse direction to that of the travel of the hanks, the hottest air meeting the driest material as it leaves the front end of the machine. The current of hot air as it flows through the machine shakes the freely supported hanks 25 and absorbs any moisture; upon reaching the cooler (9 to 16) the moisture is condensed and runs down into a tray 30 formed by the upwardly extending rim or marginal part of the main box or base 9. The air thus dried passes on to and through the fan o and as the moisture has been removed steam will not be generated when the air passes through the hot air generator a. As the air when it leaves the machine and has passed through the cooler and water extractor is still warm the hot air generator has only to slightly reheat it. It is desirable that a few groups of steam heating pipes 31 should be arranged on the lowest partition 3 and on the middle or intermediate partition 2. As the fan o tends to draw the air toward the rear from the front of the machine, the room in which the machine is placed is not unduly heated and the operators who place the poles 24 with hanks 25 thereon on the pole guides 23 at the front end of the machine and remove them from the chains 19 as they leave the machine can work in more comfort than is the case with drying machines as heretofore usually constructed.

As will be understood machines to work in the manner described, that is to say in which the air is caused to flow by a fan or the like continuously through the machine past a cooler or moisture extractor, through a hot air generator and back to the machine, can be constructed otherwise than as in the example herein described without departure from this invention, some features of which can be employed without the others.

What I claim is:—

1. In a drying plant, a drying machine comprising a main chamber open at its front end, partitions dividing said chamber into a series of compartments a chamber located at the rear of said main chamber in communication with the last compartment of said series, a cooler and water extractor arranged in said rear chamber, a hot air supply conduit in communication with the first compartment of said series, means for causing air to flow from said hot air conduit, through the several compartments of said series in succession and through said cooler and water extractor, and means adapted to convey material through said machine in the reverse direction to the flow of air.

2. In a drying plant, a drying machine comprising a main chamber open at its front end, horizontal partitions dividing said chamber into a series of compartments located one above another, a chamber located at the rear of said main chamber in communication with the lowest compartment of said series, a cooler and water extractor arranged in said rear chamber, a hot air supply conduit in communication with the top compartment of said series, means for causing air to flow from said hot air conduit, through the several compartments of said series in succession and through said cooler and water extractor, and means adapted to convey material through said machine in the reverse direction to the flow of air.

3. In a drying plant, a drying machine comprising a main chamber open at its front end, partitions dividing said chamber into a series of compartments, a chamber located at the rear of said main chamber in communication with the last compartment of said series, a tubular cooler and water extractor arranged in said rear chamber, a hot air supply conduit in communication with the first compartment of said series, means for causing air to flow from said hot air conduit, through the several compartments of said series in succession and through said cooler and water extractor, and means adapted to convey material through said machine in the reverse direction to the flow of air.

4. In a drying plant, a drying machine comprising a main chamber open at its front end, partitions dividing said chamber into a series of compartments, a chamber located at the rear of said main chamber in communication with the last compartment of said series, a cooler and water extractor arranged in said rear chamber, a hot air supply conduit in communication with the first compartment of said series, means for causing air to flow from said hot air conduit, through the several compartments of said series in succession and through said cooler and water extractor, and traveling chains adapted to convey material through said machine in the reverse direction to the flow of air.

5. In a drying plant, a drying machine comprising a main chamber open at its front end, horizontal partitions dividing said chamber into a series of compartments located one above another, a chamber located at the rear of said main chamber in communication with the lowest compartment of said series, a cooler and water extractor arranged in said rear chamber, a hot air supply conduit in communication with the top compartment of said series, means for causing air to flow from said hot air conduit, through the several compartments of said series in succession and through said cooler and water extractor, a plate to guide the air from said air supply conduit to the top compartment of said series, a plate adapted to guide the air to the lowest compartment of said series, and means adapted to convey material through said machine in the reverse direction to the flow of air.

6. In a drying plant, a drying machine comprising a main chamber open at its front end, partitions dividing said chamber into a series of compartments arranged one above another, a chamber located at the rear of said main chamber in communication with the last compartment of said series, a cooler and water extractor arranged in said rear chamber, a hot air supply conduit in communication with the first compartment of said series, means for causing air to flow from said hot air conduit, through the several compartments of said series in succession and through said cooler and water extractor, supports in one of the compartments for poles on which hanks of flax can be suspended, traveling chains passing through the compartment of said series in which said supports are located and through the compartment of said series next above it, and snugs on said chains adapted to engage poles resting on said supports and to raise them from said supports.

Signed at Moscow, Russia this sixth day of January 1910.

GEORGE HERBERT THORP.

Witnesses:
ROBERT DAVIE SMITH,
GUSTAV E. HARTWIG.